United States Patent
Hamamoto et al.

(10) Patent No.: US 12,404,816 B2
(45) Date of Patent: Sep. 2, 2025

(54) DIAGNOSTIC DEVICE FOR EXHAUST GAS AFTERTREATMENT DEVICE, DIAGNOSTIC METHOD FOR EXHAUST GAS AFTERTREATMENT DEVICE, AND DIAGNOSTIC PROGRAM FOR EXHAUST GAS AFTERTREATMENT DEVICE

(71) Applicant: KOBELCO CONSTRUCTION MACHINERY CO., LTD, Hiroshima (JP)

(72) Inventors: Ryo Hamamoto, Hiroshima (JP); Tomohiro Nakagawa, Hiroshima (JP); Kazuomi Endo, Hiroshima (JP); Hiroshi Togo, Hiroshima (JP)

(73) Assignee: KOBELCO CONSTRUCTION MACHINERY CO., LTD, Hiroshima (JP)

( * ) Notice: Subject to any disclaimer, the term of this patent is extended or adjusted under 35 U.S.C. 154(b) by 0 days.

(21) Appl. No.: 18/833,443

(22) PCT Filed: Jan. 24, 2023

(86) PCT No.: PCT/JP2023/002124
§ 371 (c)(1),
(2) Date: Jul. 26, 2024

(87) PCT Pub. No.: WO2023/149285
PCT Pub. Date: Aug. 10, 2023

(65) Prior Publication Data
US 2025/0109714 A1    Apr. 3, 2025

(30) Foreign Application Priority Data
Feb. 2, 2022 (JP) .................. 2022-014996

(51) Int. Cl.
| | | |
|---|---|---|
| *F02D 35/00* | (2006.01) | |
| *F01N 3/021* | (2006.01) | |
| *F01N 11/00* | (2006.01) | |

(52) U.S. Cl.
CPC ......... *F02D 35/0015* (2013.01); *F01N 3/021* (2013.01); *F01N 11/002* (2013.01)

(58) Field of Classification Search
CPC . F01N 3/00; F01N 3/021; F01N 9/002; F02D 45/00; F02D 35/0015; G06F 21/64
See application file for complete search history.

(56) References Cited

U.S. PATENT DOCUMENTS 9,074,505 B2 *  7/2015  Sase .................. F01N 9/002
9,151,015 B2 * 10/2015  Noguchi ............ F02D 41/222
(Continued)

FOREIGN PATENT DOCUMENTS

| EP | 2 037 090 A1 | 3/2009 |
|---|---|---|
| EP | 2 199 552 A1 | 6/2010 |

(Continued)

OTHER PUBLICATIONS

Machine translation, JP2016079811, Katsuta et al., Specification, obtained from https://worldwide.espacenet.com/, originally published May 16, 2016, pp. 1-7.*

(Continued)

*Primary Examiner* — Grant Moubry
(74) *Attorney, Agent, or Firm* — Oblon, McClelland, Maier & Neustadt, L.L.P.

(57) ABSTRACT

A diagnostic device for an exhaust gas aftertreatment device includes a temperature detection device that detects a filter inlet-side temperature and a filter outlet-side temperature, a differential pressure detection device that detects a differential pressure between a filter inlet-side pressure and a filter outlet-side pressure, an intake air pressure detection device (Continued)

that detects an intake air pressure of an engine, and a controller that determines a malfunction in an exhaust gas aftertreatment device based on values detected by the temperature detection device, the differential pressure detection device, and the intake air pressure detection device.

7 Claims, 5 Drawing Sheets

(56) References Cited

U.S. PATENT DOCUMENTS

| | | | | |
|---|---|---|---|---|
| 10,125,652 | B2* | 11/2018 | Kurisaka | F02B 37/007 |
| 11,236,654 | B2* | 2/2022 | Noguchi | F01N 3/10 |
| 2007/0251214 | A1 | 11/2007 | Nishino | |
| 2014/0238003 | A1* | 8/2014 | Sase | F02D 41/1467 60/311 |
| 2014/0308170 | A1* | 10/2014 | Takayanagi | F02D 41/029 422/119 |
| 2017/0051651 | A1* | 2/2017 | Kurisaka | F01N 3/0814 |
| 2017/0250961 | A1 | 8/2017 | Rasbornig | |
| 2019/0218753 | A1 | 7/2019 | Morimoto | |

FOREIGN PATENT DOCUMENTS

| | | |
|---|---|---|
| JP | 2007-292013 A | 11/2007 |
| JP | 2015-148182 A | 8/2015 |
| JP | 2016-70077 A | 5/2016 |
| JP | 2016-79811 A | 5/2016 |
| JP | 2017-48709 A | 3/2017 |
| JP | 2017-153082 A | 8/2017 |
| WO | WO 2018/062363 A1 | 4/2005 |

OTHER PUBLICATIONS

Machine translation, JP2015148182, Noguchi et al., Specification, obtained from https://worldwide.espacenet.com/, originally published Aug. 20, 2015, pp. 1-15.*

International Search Report Issued Mar. 7, 2023 in PCT/JP2023/002124, filed on Jan. 24, 2023, (2 pages).

Extended European Search Report issued Oct. 23, 2024 in European Patent Application No. 23749601.3, 8 pages.

* cited by examiner

DIAGNOSTIC DEVICE FOR EXHAUST GAS AFTERTREATMENT DEVICE, DIAGNOSTIC METHOD FOR EXHAUST GAS AFTERTREATMENT DEVICE, AND DIAGNOSTIC PROGRAM FOR EXHAUST GAS AFTERTREATMENT DEVICE

TECHNICAL FIELD

The present invention relates to a diagnostic device for an exhaust gas aftertreatment device, a diagnostic method for an exhaust gas aftertreatment device, and a diagnostic program for an exhaust gas aftertreatment device, the diagnostic device, the diagnostic method, and the diagnostic program diagnosing a malfunction in an exhaust gas aftertreatment device provided in a vehicle.

BACKGROUND ART

Patent Literature 1 discloses a particulate filter malfunction diagnostic device that determines a malfunction in a particulate filter based on a deposition amount of particulate matter (PM). A PM sensor detects the deposition amount of PM based on a change in electric resistance between a pair of electrodes.

In addition, Patent Literature 2 discloses a diagnostic device that includes a PM sensor including at least a pair of electrode members forming a capacitor, the PM sensor being provided in a filter member disposed downstream of a diesel particulate filter (DPF), and that determines a malfunction in the DPF based on electrostatic capacitance between the electrode members.

However, with the PM sensor of Patent Literature 1, a great change in an output is inevitable due to adhesion of PM having a large particle size to a portion between the pair of electrode members. Further, in Patent Literature 2, a capacitor has to be added, and an improvement in DPF is necessary.

CITATION LIST

Patent Literature

Patent Literature 1: JP 2017-48709 A
Patent Literature 2: JP 2016-70077 A

SUMMARY OF INVENTION

An object of the present invention is to provide a diagnostic device for an exhaust gas aftertreatment device, a diagnostic method for the exhaust gas aftertreatment device, and a diagnostic program for the exhaust gas aftertreatment device, the diagnostic device, diagnostic method, and diagnostic program being capable of detecting a malfunction in the exhaust gas aftertreatment device with high accuracy.

Provided is a diagnostic device for an exhaust gas aftertreatment device that has a filter for collecting fine particles from exhaust gas of an engine and is provided in a vehicle, the diagnostic device diagnosing a malfunction in the exhaust gas aftertreatment device, the diagnostic device including: a temperature detection device that detects a filter inlet-side temperature and a filter outlet-side temperature; a differential pressure detection device that detects a differential pressure between a filter inlet-side pressure and a filter outlet-side pressure; an intake air pressure detection device that detects an intake air pressure of the engine; and a controller that determines a malfunction in the exhaust gas aftertreatment device based on values detected by the temperature detection device, the differential pressure detection device, and the intake air pressure detection device.

Further, provided is a diagnostic method for an exhaust gas aftertreatment device that has a filter for collecting fine particles from exhaust gas of an engine and is provided in a vehicle, the diagnostic method for diagnosing a malfunction in the exhaust gas aftertreatment device, the diagnostic method including: a temperature detection step of detecting a filter inlet-side temperature and a filter outlet-side temperature; a differential pressure detection step of detecting a differential pressure between a filter inlet-side pressure and a filter outlet-side pressure; an intake air pressure detection step of detecting an intake air pressure of the engine; and a determination step of determining a malfunction in the exhaust gas aftertreatment device based on values detected in the temperature detection step, the differential pressure detection step, and the intake air pressure detection step.

Further, provided is a diagnostic program for an exhaust gas aftertreatment device that has a filter for collecting fine particles from exhaust gas of an engine and is provided in a vehicle, the diagnostic program for causing a computer to diagnose a malfunction in the exhaust gas aftertreatment device, the diagnostic program including causing the computer to determine a malfunction in the exhaust gas aftertreatment device based on a filter inlet-side temperature, a filter outlet-side temperature, a differential pressure between a filter inlet-side pressure and a filter outlet-side pressure, and an intake air pressure of the engine.

In the present invention, a malfunction in the exhaust gas aftertreatment device is determined based on the filter inlet-side temperature, the filter outlet-side temperature, the differential pressure between the filter inlet-side pressure and the filter outlet-side pressure, and the intake air pressure of the engine. The deposition amount of fine particles deposited on the filter can be obtained from the differential pressure between the filter inlet-side pressure and the filter outlet-side pressure. A temperature state of the filter is obtained from the filter inlet-side temperature and the filter outlet-side temperature. Therefore, before the filter is damaged by melting, a malfunction in the exhaust gas aftertreatment device can be detected by using the differential pressure between the filter inlet-side pressure and the filter outlet-side pressure, the filter inlet-side temperature, and the filter outlet-side temperature for determination. In the present invention, unlike the PM sensor of Patent Literature 1, the outputs from the temperature detection device, the differential pressure detection device, and the intake air pressure detection device do not change significantly. Therefore, the malfunction in the exhaust gas aftertreatment device can be detected with high accuracy.

DESCRIPTION OF EMBODIMENTS

A preferred embodiment of the present invention will be described below with reference to the drawings.

Configuration of Work Machine

Figure 1:
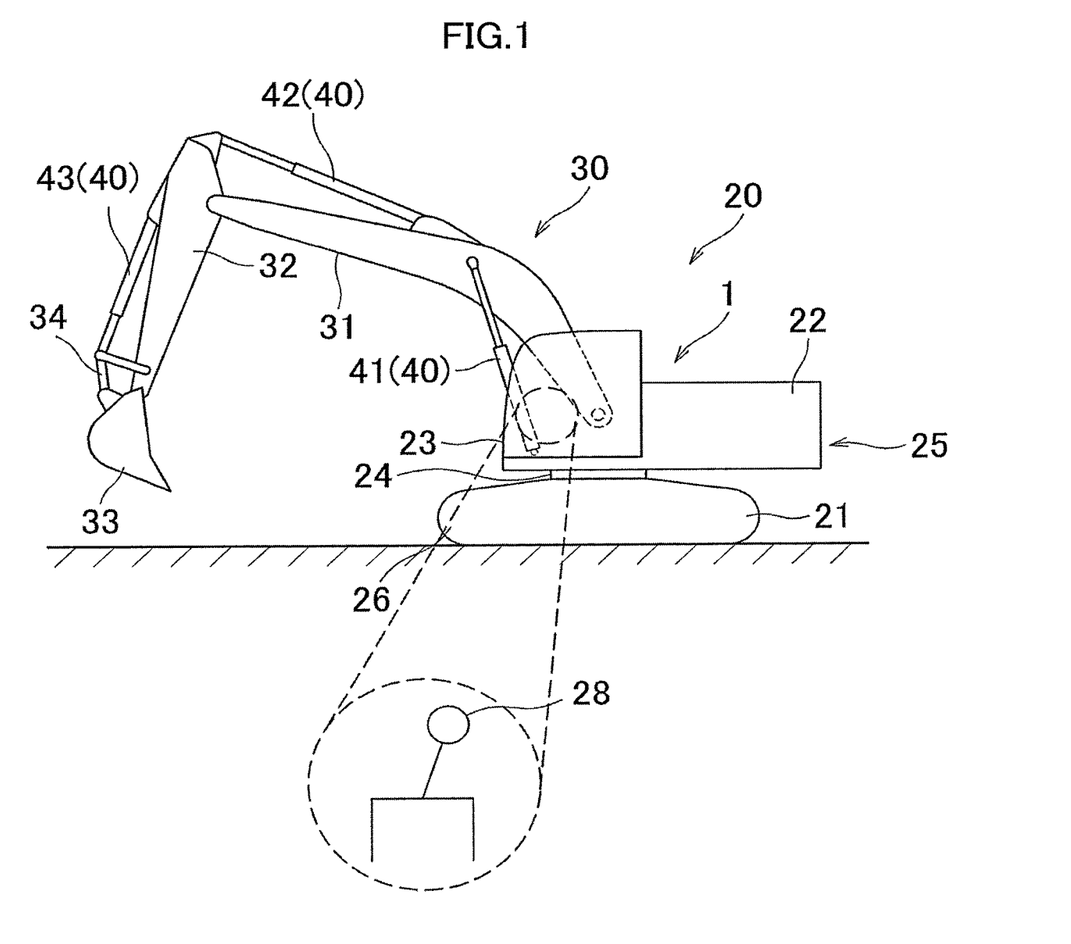
FIG. 1 is a side view of a work machine.

A diagnostic device (diagnostic device 1) for an exhaust gas aftertreatment device according to an embodiment of the present invention diagnoses a malfunction in the exhaust gas aftertreatment device provided in a vehicle. As illustrated in FIG. 1 which is a side view of a work machine 20, the diagnostic device 1 is provided in the work machine 20. The work machine 20 is one example of a vehicle, and is, for example, a hydraulic excavator. The work machine 20 may be operated by an operator in a cab 23, may be remotely operated, or may be automatically operated.

The work machine 20 has a machine main body 25 including a lower travelling body 21 and an upper slewing body 22, an attachment 30, and cylinders 40.

The lower travelling body 21 is a portion that causes the work machine 20 to travel, and includes, for example, right and left crawlers 26. The upper slewing body 22 is slewably attached to an upper part of the lower travelling body 21 via a slewing device 24. The cab 23 is provided at a front part of the upper slewing body 22.

The attachment 30 is attached to the upper slewing body 22 to be rotatable in an up-and-down direction. The attachment 30 includes a boom 31, an arm 32, and a bucket 33. The boom 31 is attached to the upper slewing body 22 to be rotatable in the up-and-down direction (capable of being raised and lowered). The arm 32 is attached to the boom 31 to be rotatable in the up-and-down direction. The bucket 33 is attached to the arm 32 to be rotatable in a front-and-rear direction. The bucket 33 is a tip attachment that is a tip portion of the attachment 30, and is a part that performs work such as excavation, leveling, and scooping of earth and sand. Note that a work object to be held by the bucket 33 is not limited to earth and sand, but may also be stones or waste (such as industrial waste). The tip attachment is not limited to the bucket 33, and may be a grapple, a lifting magnet, or the like.

The cylinders 40 can hydraulically turn the attachment 30. The cylinders 40 are hydraulic telescopic cylinders. The cylinders 40 include a boom cylinder 41, an arm cylinder 42, and a bucket cylinder 43.

The boom cylinder 41 rotates the boom 31 with respect to the upper slewing body 22. The boom cylinder 41 has a base end portion rotatably attached to the upper slewing body 22. The boom cylinder 41 has a tip portion rotatably attached to the boom 31.

The arm cylinder 42 rotates the arm 32 with respect to the boom 31. The arm cylinder 42 has a base end portion rotatably attached to the boom 31. The arm cylinder 42 has a tip portion rotatably attached to the arm 32.

The bucket cylinder 43 rotates the bucket 33 with respect to the arm 32. The bucket cylinder 43 has a base end portion rotatably attached to the arm 32. The bucket cylinder 43 has a tip portion rotatably attached to a link member 34 rotatably attached to the bucket 33.

Configuration of Hydraulic Circuit of Work Machine

Figure 2:
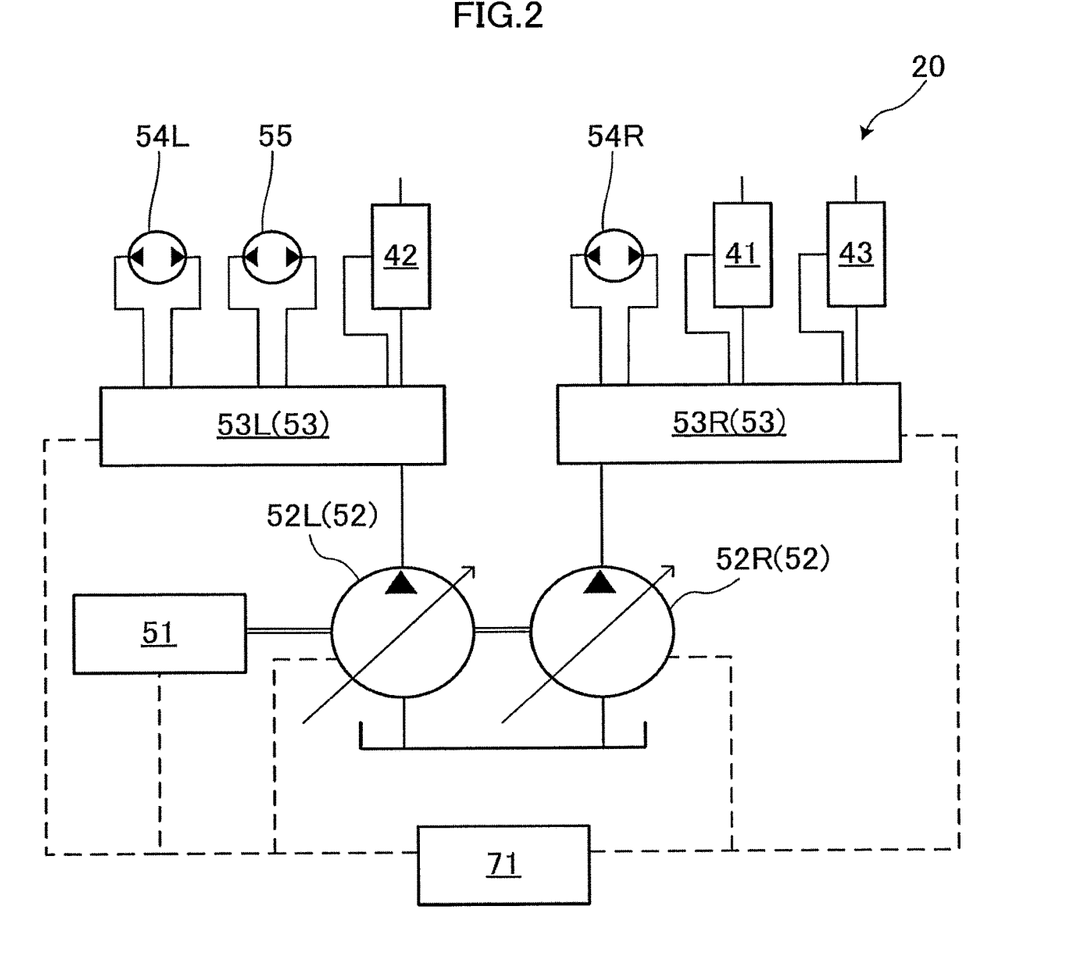
FIG. 2 is a configuration diagram illustrating a hydraulic circuit of the work machine.

As illustrated in FIG. 2 which is a configuration diagram illustrating the hydraulic circuit of the work machine 20, the work machine 20 includes an engine 51, a hydraulic pump 52, and a control valve group 53. The engine 51 is a power source of the work machine 20. The hydraulic pump 52 is driven by the engine 51. The hydraulic pump 52 includes a left hydraulic pump 52L and a right hydraulic pump 52R. The control valve group 53 changes a flow rate of hydraulic oil supplied from the hydraulic pump 52 to the cylinders 40 and the like. The control valve group 53 includes a left control valve group 53L and a right control valve group 53R.

The left hydraulic pump 52L supplies hydraulic oil to each of a left traveling motor 54L, a slewing motor 55, and the arm cylinder 42. The right hydraulic pump 52R supplies hydraulic oil to each of a right traveling motor 54R, the boom cylinder 41, and the bucket cylinder 43. Note that FIG. 2 illustrates one example of the arrangement of these components, and the arrangement of these components is not limited to FIG. 2. The left traveling motor 54L drives the left crawler 26 of the lower travelling body 21, and the right traveling motor 54R drives the right crawler 26 of the lower travelling body 21. The slewing motor 55 is provided in the slewing device 24 and slews the upper slewing body 22.

The left control valve group 53L includes a control valve that changes the flow rate of the hydraulic oil supplied to the left traveling motor 54L, a control valve that changes the flow rate of the hydraulic oil supplied to the slewing motor 55, and a control valve that changes the flow rate of the hydraulic oil supplied to the arm cylinder 42. The right control valve group 53R includes a control valve that changes the flow rate of the hydraulic oil supplied to the right traveling motor 54R, a control valve that changes the flow rate of the hydraulic oil supplied to the boom cylinder 41, and a control valve that changes the flow rate of the hydraulic oil supplied to the bucket cylinder 43. These control valves are controlled by a controller 71 in response to an operation supplied to an operation device 28 (see FIG. 1) including at least one operation lever provided in the cab 23. Note that in the present embodiment, the operation device 28 includes a plurality of operation levers, and these operation levers are disposed in the cab 23.

The engine 51, the hydraulic pump 52, and the control valve group 53 are controlled by the controller 71 described later.

As illustrated in FIG. 1, the left and right crawlers 26, the upper slewing body 22, and the attachment 30 are movable portions of the work machine 20. The operation device 28 outputs operation commands for operating the movable portions. As illustrated in FIG. 2, the engine 51, the hydraulic pump 52, and the control valve group 53 are power sources that supply power to the movable portions.

Configuration of Exhaust Gas Aftertreatment Device

Figure 3:
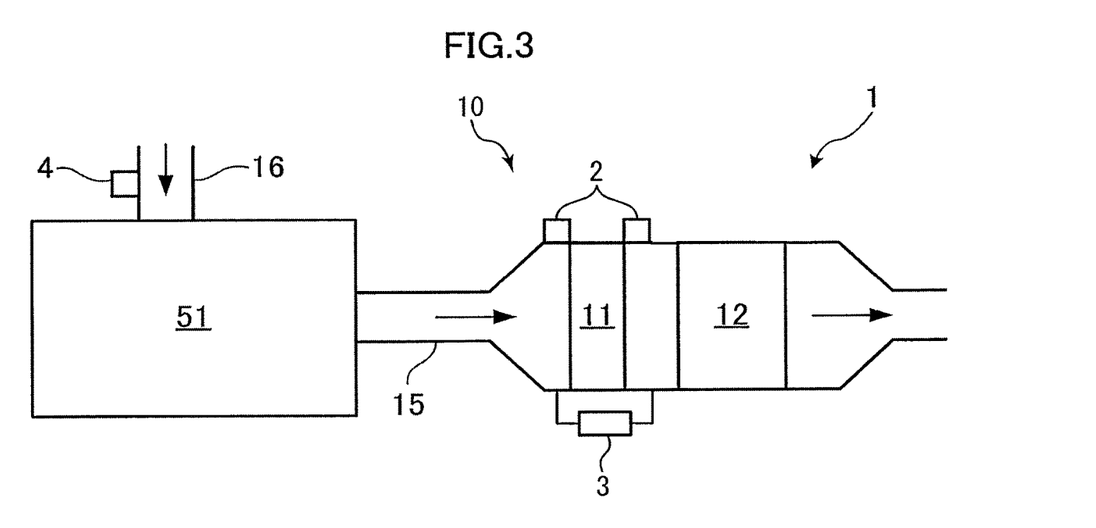
FIG. 3 is a configuration diagram of an exhaust gas aftertreatment device.

As illustrated in FIG. 3 which is a configuration diagram of the exhaust gas aftertreatment device 10, the work machine 20 includes the exhaust gas aftertreatment device 10. The exhaust gas aftertreatment device 10 is provided in an exhaust pipe 15 through which an exhaust gas of the engine 51 passes, and collects fine particles from the exhaust gas. The exhaust gas aftertreatment device 10 includes a filter 11 that collects fine particles, and an oxidation catalyst 12 that is provided downstream of the filter 11 and oxidizes unburnt fuel.

The diagnostic device 1 includes temperature sensors 2 (one example of a temperature detection device), a differential pressure sensor 3 (one example of a differential pressure detection device), and an intake air pressure sensor 4 (one example of an intake air pressure detection device). The temperature sensors 2 respectively detect a filter inlet-side temperature and a filter outlet-side temperature. The differential pressure sensor 3 detects a differential pressure between a filter inlet-side pressure and a filter outlet-side pressure (for example, a differential pressure between an inlet side and an outlet side of the filter 11). The intake air pressure sensor 4 is provided in an intake air pipe 16 that supplies air to the engine 51, and detects an intake air pressure (boost pressure) of the engine 51.

The filter inlet-side temperature is a temperature detected by the temperature sensor 2 disposed at an exhaust gas inlet of the filter 11 or near the inlet. Specifically, the filter inlet-side temperature may be a temperature of the exhaust gas at the inlet of the filter 11 or the temperature of the filter 11 at the inlet of the filter 11. Further, the filter inlet-side temperature may be a temperature of the exhaust gas near the inlet upstream of the inlet of the filter 11 or a temperature of the pipe near the inlet upstream of the inlet of the filter 11.

The filter outlet-side temperature is a temperature detected by the temperature sensor 2 disposed at the exhaust gas outlet of the filter 11 or near the outlet. Specifically, the filter outlet-side temperature may be a temperature of the exhaust gas at the outlet of the filter 11 or a temperature of the filter 11 at the outlet of the filter 11. Further, the filter outlet-side temperature may be a temperature of the exhaust gas near the outlet downstream of the outlet of the filter 11, or may be a temperature of the pipe near the outlet downstream of the outlet of the filter 11.

The filter inlet-side pressure may be a pressure at the inlet of the filter 11, or may be a pressure near the inlet upstream of the inlet of the filter 11. The filter outlet-side pressure may be a pressure at the outlet of the filter 11, or may be a pressure near the outlet downstream of the outlet of the filter 11. Each of "upstream" and "downstream" is based on the flow direction of the exhaust gas.

Configuration of Electric Circuit of Work Machine

Figure 4:
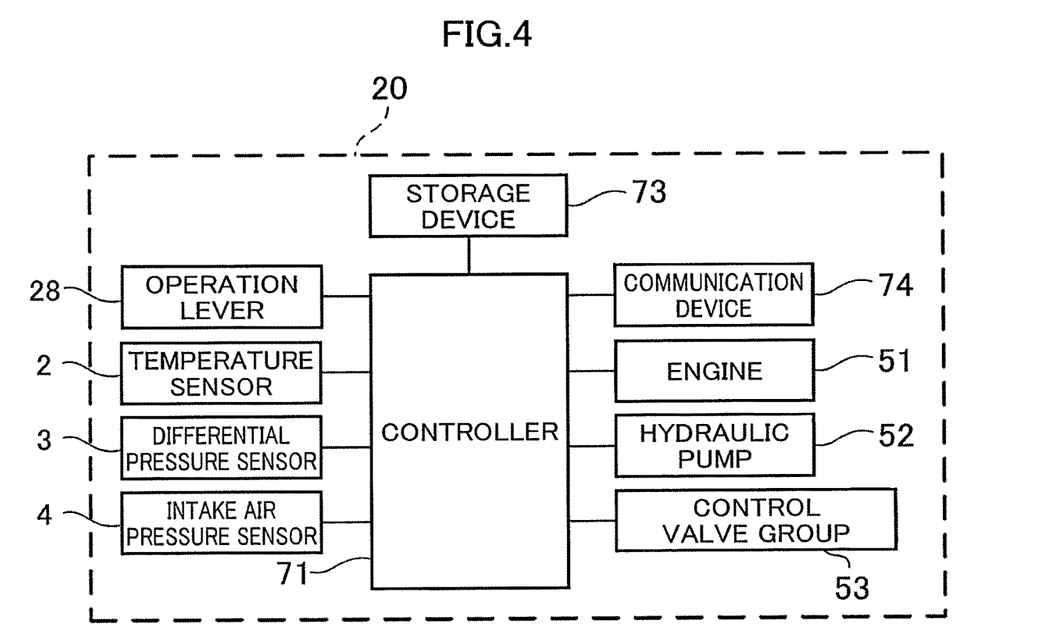
FIG. 4 is a configuration diagram illustrating an electric circuit of the work machine.

As illustrated in FIG. 4 which is a configuration diagram of an electric circuit of the work machine 20, the work machine 20 includes the controller 71, a storage device 73, and a communication device 74.

The controller 71 includes a computer that inputs and outputs signals, performs arithmetic (processing), stores information, and the like. For example, the controller 71 includes determination means, notification means, limiting means, accumulated time calculation means, and security processing means, described later. Functions of the determination means, the notification means, the limiting means, the accumulated time calculation means, and the security processing means in the controller 71 are implemented by executing programs stored in the storage unit (not illustrated) of the controller 71. The controller 71 may be provided at only one place or may be provided separately at a plurality of places. The controller 71 may be mounted on the work machine 20 or may be disposed in a server or the like outside the work machine 20. The diagnostic device 1 includes the controller 71.

The controller 71 receives the temperature values respectively detected by the temperature sensors 2. The controller 71 handles, for example, a temperature value expressed as an absolute temperature. Further, the controller 71 receives a differential pressure value detected by the differential pressure sensor 3. Further, the controller 71 receives a pressure value detected by the intake air pressure sensor 4. The controller 71 periodically acquires the temperature values respectively detected by the temperature sensors 2, the differential pressure value detected by the differential pressure sensor 3, and the pressure value detected by the intake air pressure sensor 4.

Further, the controller 71 receives an operation command from the operation device 28.

The communication device 74 can transmit and receive data by performing communication such as wireless communication or wired communication with a server or the like outside the work machine 20.

The controller 71 (specifically, the determination means) determines a malfunction in the exhaust gas aftertreatment device 10 based on the values detected respectively by the temperature sensors 2, the differential pressure sensor 3, and the intake air pressure sensor 4. Specifically, for example, the controller 71 may determine a malfunction in the exhaust gas aftertreatment device 10 based on an index. The index may be a value based on a ratio between the filter inlet-side temperature and the filter outlet-side temperature and a ratio between the differential pressure (differential pressure between the filter inlet-side pressure and the filter outlet-side pressure) and the intake air pressure of the engine 51. The controller 71 may determine that the exhaust gas aftertreatment device 10 has malfunctioned when the index exceeds a threshold.

More specifically, in a case where a value obtained by dividing the filter outlet-side temperature by the filter inlet-side temperature is represented by "a", and a value obtained by dividing the differential pressure between the filter inlet-side pressure and the filter outlet-side pressure by the intake air pressure of the engine 51 is represented by "b", the index may be a value represented by "a/b".

In a case where the filter 11 is clogged, the ratio of the differential pressure to the intake air pressure of the engine 51 in the exhaust gas aftertreatment device 10 is greater than the ratio in the normal state, and the value of "b" is greater. The case where the filter 11 is clogged is a state where a large amount of fine particles are deposited on the filter 11, and burning the fine particles in this state may cause a damage of the filter 11 due to melting. On the other hand, when the value of "b" increases, the index "a/b" falls below a lower limit value (threshold) in the normal state. Therefore, before the filter 11 is damaged by melting, the controller 71 can detect a malfunction in the exhaust gas aftertreatment device 10 by detecting that the index falls below the lower limit value.

The higher the temperature of the filter 11, the greater the value of "a", which is the ratio between the filter inlet-side temperature and the filter outlet-side temperature. In a case where the temperature of the filter 11 becomes high, a damage of the filter 11 due to melting might occur. On the other hand, when the value of "a" increases, the index "a/b" exceeds an upper limit value (threshold) in the normal state. Therefore, before the filter 11 is damaged by melting, the controller 71 can detect a malfunction in the exhaust gas aftertreatment device 10 by detecting that the index exceeds an upper limit value.

Note that the index may be obtained by multiplying "a/b" by a coefficient learned from past data. For example, the index may be obtained by multiplying a numerical value of "g (a/b)" including "a/b" by a coefficient f(t) that changes with time t. Specifically, for example, "f(t)=t" and "g(a/b)=(a/b)$^2$" may be allowable, and in this case, the index increases with the lapse of time.

Note that the values of "a" and "b" in the index may be weighted. For example, the value of "a" may be set to have a greater weight than the value of "b". Further, the index may be a product "a×b" obtained from "a" and "b". In this case, the upper limit value (threshold) of the index in the normal state is set in consideration of a fact that the value of "b" increases when the filter 11 is clogged and the value of "a" increases when the filter 11 has a high temperature. Before the filter 11 is damaged by melting, the controller 71 can detect a malfunction in the exhaust gas aftertreatment device 10 by detecting that the index exceeds the upper limit value (threshold).

As described above, a malfunction in the exhaust gas aftertreatment device 10 is determined based on the filter inlet-side temperature, the filter outlet-side temperature, the differential pressure between the filter inlet-side pressure and the filter outlet-side pressure, and the intake air pressure of the engine 51. The deposition amount of fine particles deposited on the filter 11 can be obtained from the differential pressure between the filter inlet-side pressure and the filter outlet-side pressure. A temperature state of the filter 11 is obtained from the filter inlet-side temperature and the filter outlet-side temperature. Therefore, before the filter 11 is damaged by melting, a malfunction in the exhaust gas aftertreatment device 10 can be detected by using the differential pressure between the filter inlet-side pressure and the filter outlet-side pressure, the filter inlet-side temperature, and the filter outlet-side temperature for the determination. In the present embodiment, unlike the PM sensor of Patent Literature 1, the outputs from the temperature sensors 2, the differential pressure sensor 3, and the intake air pressure sensor 4 do not change significantly. Therefore, the malfunction in the exhaust gas aftertreatment device 10 can be detected with high accuracy.

Further, in the present embodiment, a malfunction in the exhaust gas aftertreatment device 10 is determined based on the index that is the value obtained by multiplying the ratio between the filter inlet-side temperature and the filter outlet-side temperature by a ratio between the differential pressure between the filter inlet-side pressure and the filter outlet-side pressure and the intake air pressure of the engine 51. Since such an index is dimensionless, a malfunction in the exhaust gas aftertreatment device 10 can be detected with high accuracy by using this index for any type of the work machine 20.

The controller 71 (specifically, the notification means) may perform control for notifying a determination result in a case where the controller 71 (specifically, the determination means) determines that the exhaust gas aftertreatment device 10 has malfunctioned. Specifically, for example, in a case where the work machine 20 includes a notification device, in the work machine 20, when the notification device notifies the determination result, a malfunction in the exhaust gas aftertreatment device 10 is notified to the operator who operates the work machine 20. The notification device may be, for example, a speaker or a display provided in the cab 23 of the work machine 20. In addition, the controller 71 may transmit a fact that the exhaust gas aftertreatment device 10 has malfunctioned to an external device such as a server located outside the work machine 20, via the communication device 74. In this case, a malfunction in the exhaust gas aftertreatment device 10 can be notified to a person outside the work machine 20. Therefore, for example, in a case where the work machine 20 is automatically operated, the operation can be stopped by operating the work machine 20. Further, the controller 71 may transmit the fact that the exhaust gas aftertreatment device 10 has malfunctioned to a terminal device for remotely operating the work machine 20. In this case, the malfunction in the exhaust gas aftertreatment device 10 can be notified to a remote operator who performs a remote operation. As described above, it is possible to prevent the work machine 20 from continuing to operate in a situation where the filter 11 is likely to be damaged by melting.

Further, the controller 71 (specifically, the limiting means) may perform control for limiting the output from the power source within a predetermined range in a case where the controller 71 (specifically, the determination means) determines that the exhaust gas aftertreatment device 10 has malfunctioned. Specifically, the controller 71 limits an output from at least one of the engine 51, the hydraulic pump 52, and the control valve group 53 within the predetermined range.

When the upper limit value of the output from the power source is limited, the damage of the filter 11 due to melting can be reduced. In addition, in a case where the lower limit value of the output from the power source is limited and the load applied to the engine 51 is increased, the regeneration processing of the exhaust gas aftertreatment device 10 can be assisted. The regeneration processing is processing for increasing the load on the engine 51 and heating the filter 11 to burn the fine particles deposited on the filter 11.

Further, the controller 71 (specifically, the accumulated time calculation means) may calculate an accumulated time during which the operation device 28 outputs an operation command in a state where the controller 71 (specifically, the limiting means) limits the output from the power source. The controller 71 stores the accumulated time in the storage device 73. As a result, a determination is made that the exhaust gas aftertreatment device 10 has malfunctioned, and it can be seen how long the movable portions have been operating in a state where the output from the power source is limited. The controller 71 then transmits the accumulated time stored in the storage device 73 from the communication device 74 to the outside, for example, at timing when the engine 51 is stopped.

The controller 71 (specifically, the security processing means) performs processing relating to information security on at least one of the values detected by the temperature sensors 2, the differential pressure sensor 3, and the intake air pressure sensor 4. Specifically, at least one of the temperature sensors 2, the differential pressure sensor 3, and the intake air pressure sensor 4 gives a signature to the detection value to be transmitted to the controller 71. The controller 71 verifies the signature, and in a case where the verification succeeds, calculates an index based on the detection value to which the signature is given. When verifying the signature given to the detection value transmitted to the controller 71, the controller 71 can detect modification of the detection value, and can check a transmission source to prevent spoof. Accordingly, the security of the detection value can be ensured. Note that an external device such as a server outside the work machine 20 may verify the signature. In addition, the controller 71 itself is desirably mounted in a region having tamper resistance. For example, it is desirable that the controller 71 is stored in a housing so as to be hardly removed in an unauthorized manner, or to enable detection of unauthorized removal of the controller 71 from the housing.

Note that at least one of the temperature sensors 2, the differential pressure sensor 3, and the intake air pressure sensor 4 may encrypt the detection value to be transmitted to the controller 71. The encryption may be public key encryption or common key encryption. The controller 71 decrypts the encrypted detection value, and calculates an index based on the decrypted detection value when the decryption succeeds. When the controller 71 decrypts the encrypted detection value transmitted to the controller 71, high confidentiality can be maintained. Accordingly, the security of the detection value can be ensured. Note that an external device such as a server outside the work machine 20 may decrypt the detection value. Further, the controller 71 desirably stores the encrypted detection value in an area having tamper resistance (a chip or the like having tamper resistance against unauthorized access).

Operation of Diagnostic Device

Figure 5:
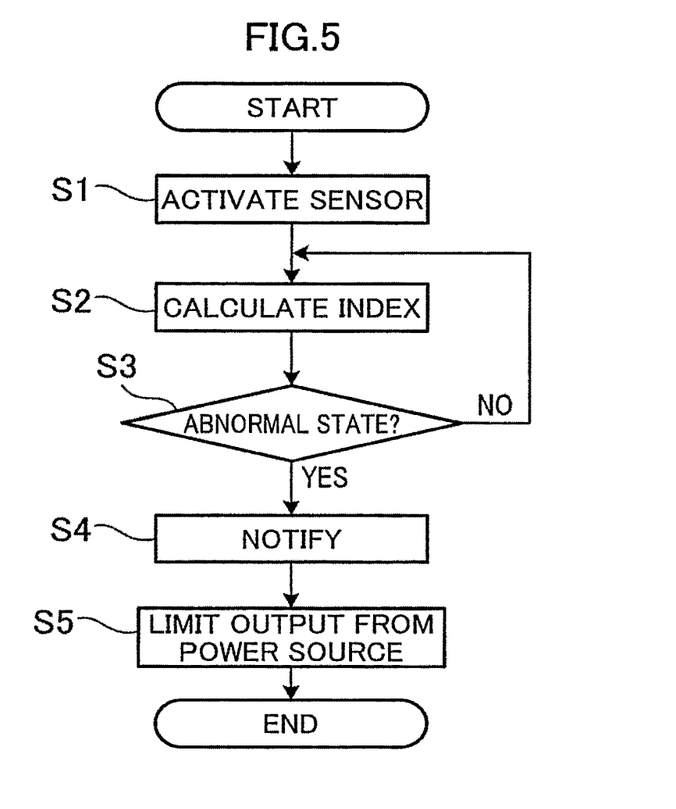
FIG. 5 is a flowchart of diagnostic processing.

Next, the operation of the diagnostic device 1 will be described with reference to FIG. 5 which is a flowchart of diagnostic processing.

First, the controller 71 activates the temperature sensors 2, the differential pressure sensor 3, and the intake air pressure sensor 4 (step S1). Next, the controller 71 calculates an index based on the detection values of the temperature sensors 2, the differential pressure sensor 3, and the intake air pressure sensor 4 (step S2). Specifically, the controller 71 detects the filter inlet-side temperature and the filter outlet-side temperature based on the values detected respectively by the temperature sensors 2 (temperature detection step), detects the differential pressure between the filter inlet-side pressure and the filter outlet-side pressure based on the value detected by the differential pressure sensor 3 (differential pressure detection step), detects the intake air pressure of the engine 51 based on the value detected by the intake air pressure sensor 4 (intake air pressure detection step), and calculates an index using these detection results.

Next, the controller 71 determines whether the exhaust gas aftertreatment device 10 is in a malfunction state (abnormal state) (step S3: determination step). In a case where a determination is made in step S3 as not being in the abnormal state (S3: NO), the controller 71 returns to step S2. On the other hand, in a case where the determination is made in step S3 as being in the abnormal state (S3: YES), the controller 71 notifies the determination result (step S4). Then, the controller 71 limits the output from the power source within a predetermined range (step S5), and ends this flow.

As described above, the diagnostic device 1 according to the present embodiment determines a malfunction in the exhaust gas aftertreatment device 10 based on the filter inlet-side temperature, the filter outlet-side temperature, the differential pressure between the filter inlet-side pressure and the filter outlet-side pressure, and the intake air pressure of the engine 51. The deposition amount of fine particles deposited on the filter 11 can be obtained from the differential pressure between the filter inlet-side pressure and the filter outlet-side pressure. A temperature state of the filter 11 is obtained from the filter inlet-side temperature and the filter outlet-side temperature. Therefore, before the filter 11 is damaged by melting, a malfunction in the exhaust gas aftertreatment device 10 can be detected by using the differential pressure between the filter inlet-side pressure and the filter outlet-side pressure, the filter inlet-side temperature, and the filter outlet-side temperature for the determination. In the diagnostic device 1 according to the present embodiment, unlike the PM sensor of Patent Literature 1, the outputs from the temperature sensors 2, the differential pressure sensor 3, and the intake air pressure sensor 4 do not change significantly. Therefore, the malfunction in the exhaust gas aftertreatment device 10 can be detected with high accuracy.

Further, in the present embodiment, the controller 71 can determine a malfunction in the exhaust gas aftertreatment device 10 based on the index that is the value obtained by multiplying the ratio between the filter inlet-side temperature and the filter outlet-side temperature by the ratio between the differential pressure between the filter inlet-side pressure and the filter outlet-side pressure and the intake air pressure of the engine 51. Since such an index is dimensionless, a malfunction in the exhaust gas aftertreatment device 10 can be detected with high accuracy by using this index for any type of the work machine 20.

Further, in the present embodiment, in a case where a determination is made that the exhaust gas aftertreatment device 10 has malfunctioned, the determination result can be notified. For example, in a case where the determination result is notified in the work machine 20, the malfunction in the exhaust gas aftertreatment device 10 can be notified to the operator who operates the work machine 20. Further, in a case where the determination result is notified to the outside of the work machine 20 via the communication device 74, the malfunction in the exhaust gas aftertreatment device 10 can be notified to a person outside the work machine 20. Therefore, for example, in a case where the work machine 20 is automatically operated, the operation can be stopped by operating the work machine 20. In a case where the malfunction in the exhaust gas aftertreatment device 10 is transmitted to the terminal device for remotely operating the work machine 20, the malfunction in the exhaust gas aftertreatment device 10 can be notified to the remote operator who performs the remote operation. Therefore, it is possible to prevent the work machine 20 from continuing to operate in a situation where the filter 11 is likely to be damaged by melting.

Further, in the present embodiment, in a case where a determination is made that the exhaust gas aftertreatment device 10 has malfunctioned, the output from the power source can be limited within a predetermined range. When the upper limit value of the output from the power source is limited, the damage of the filter 11 due to melting can be reduced. In addition, in a case where the lower limit value of the output from the power source is limited and the load applied to the engine 51 is increased, the regeneration processing of the exhaust gas aftertreatment device 10 can be assisted.

Further, in the present embodiment, it is possible to calculate the accumulated time during which the operation device 28 outputs an operation command in a state where the output from the power source is limited. As a result, a determination is made that the exhaust gas aftertreatment device 10 has malfunctioned, and it can be seen how long the movable portions have been operating in a state where the output from the power source is limited.

Further, in the present embodiment, processing relating to information security can be performed on at least one of the values detected respectively by the temperature sensors 2, the differential pressure sensor 3, and the intake air pressure sensor 4. As a result, for example, modification of a detection value is detected or the detection value is encrypted, thus securing the security of information.

Although the embodiment of the present invention has been described above, only specific example has been described, and the present invention is not particularly limited to the embodiment, and a specific configuration and the like can be modified in design as appropriate. In addition, the actions and effects described in the embodiment of the present invention merely recite the most suitable actions and effects resulting from the present invention, and the actions and effects according to the present invention are not limited to those described in the embodiment of the present invention.

The invention claimed is:
1. A diagnostic device for an exhaust gas aftertreatment device that has a filter for collecting fine particles from exhaust gas of an engine and is provided in a vehicle, the diagnostic device diagnosing a malfunction in the exhaust gas aftertreatment device, the diagnostic device comprising:
- a temperature detection device that detects a filter inlet-side temperature and a filter outlet-side temperature;
- a differential pressure detection device that detects a differential pressure between a filter inlet-side pressure and a filter outlet-side pressure;
- an intake air pressure detection device that detects an intake air pressure of the engine; and
- a controller that determines the malfunction in the exhaust gas aftertreatment device based on values detected by the temperature detection device, the differential pressure detection device, and the intake air pressure detection device,
- wherein the controller determines the malfunction in the exhaust gas aftertreatment device based on an index, and
- wherein the index is a value based on a ratio between the filter inlet-side temperature and the filter outlet-side temperature and a ratio between the differential pressure and the intake air pressure of the engine.

2. The diagnostic device for the exhaust gas aftertreatment device according to claim 1, wherein the controller performs control for notifying a determination result in a case where the controller determines that the exhaust gas aftertreatment device has malfunctioned.

3. The diagnostic device for the exhaust gas aftertreatment device according to claim 1, wherein
- the vehicle is a work machine,
- the work machine includes
- a plurality of movable portions, and
- a power source that supplies power to the plurality of movable portions, and
- the controller performs control for limiting an output from the power source within a predetermined range in a case where the controller determines that the exhaust gas aftertreatment device has malfunctioned.

4. A diagnostic device for an exhaust gas aftertreatment device that has a filter for collecting fine particles from exhaust gas of an engine and is provided in a vehicle, the diagnostic device diagnosing a malfunction in the exhaust gas aftertreatment device, the diagnostic device comprising:
- a temperature detection device that detects a filter inlet-side temperature and a filter outlet-side temperature;
- a differential pressure detection device that detects a differential pressure between a filter inlet-side pressure and a filter outlet-side pressure;
- an intake air pressure detection device that detects an intake air pressure of the engine; and
- a controller that determines the malfunction in the exhaust gas aftertreatment device based on values detected by the temperature detection device, the differential pressure detection device, and the intake air pressure detection device,
- wherein the vehicle is a work machine, and the work machine includes
- a plurality of movable portions, and
- a power source that supplies power to the plurality of movable portions, and
- wherein the controller performs control for limiting an output from the power source within a predetermined range in a case where the controller determines that the exhaust gas aftertreatment device has malfunctioned,
- wherein the diagnostic device further comprises an operation device that outputs operation commands for operating the movable portions,
- wherein the controller calculates an accumulated time during which the operation device outputs the operation commands in a state where the output from the power source is limited.

5. The diagnostic device for the exhaust gas aftertreatment device according to claim 1, wherein the controller performs processing relating to information security on at least one of the values detected respectively by the temperature detection device, the differential pressure detection device, and the intake air pressure detection device.

6. A diagnostic method for an exhaust gas aftertreatment device that has a filter for collecting fine particles from exhaust gas of an engine and is provided in a vehicle, the diagnostic method for diagnosing a malfunction in the exhaust gas aftertreatment device, the diagnostic method comprising:
- a temperature detection step of detecting a filter inlet-side temperature and a filter outlet-side temperature;
- a differential pressure detection step of detecting a differential pressure between a filter inlet-side pressure and a filter outlet-side pressure;
- an intake air pressure detection step of detecting an intake air pressure of the engine; and
- a determination step, which is executed by a controller, of determining the malfunction in the exhaust gas aftertreatment device based on values detected in the temperature detection step, the differential pressure detection step, and the intake air pressure detection step,
- wherein the controller determines the malfunction in the exhaust gas aftertreatment device based on an index, and
- wherein the index is a value based on a ratio between the filter inlet-side temperature and the filter outlet-side temperature and a ratio between the differential pressure and the intake air pressure of the engine.

7. A diagnostic program for an exhaust gas aftertreatment device that has a filter for collecting fine particles from exhaust gas of an engine and is provided in a vehicle, the diagnostic program for causing a computer to diagnose a malfunction in the exhaust gas aftertreatment device, the diagnostic program comprising
- causing the computer to determine the malfunction in the exhaust gas aftertreatment device based on a filter inlet-side temperature, a filter outlet-side temperature, a differential pressure between a filter inlet-side pressure and a filter outlet-side pressure, and an intake air pressure of the engine,
- wherein the computer determines the malfunction in the exhaust gas aftertreatment device based on an index, and
- wherein the index is a value based on a ratio between the filter inlet-side temperature and the filter outlet-side temperature and a ratio between the differential pressure and the intake air pressure of the engine.

\* \* \* \* \*